US012774079B2

(12) United States Patent
Mclaughlin et al.

(10) Patent No.: US 12,774,079 B2
(45) **Date of Patent: *Oct. 27, 2026**

(54) HIGH-RELIABILITY FLIGHT TERMINATION SYSTEM FOR BALLOON SYSTEMS

(71) Applicant: URBAN SKY, Denver, CO (US)

(72) Inventors: Maxmillion J. W. Mclaughlin, Fort Myers, FL (US); Jared Leidich, Denver, CO (US); Nathan Henault, Arvada, CO (US)

(73) Assignee: URBAN SKY THEORY INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/232,695

(22) Filed: Jun. 9, 2025

(65) Prior Publication Data

US 2025/0304234 A1 Oct. 2, 2025

Related U.S. Application Data

(63) Continuation of application No. 18/735,101, filed on Jun. 5, 2024, now Pat. No. 12,351,291.

(60) Provisional application No. 63/507,392, filed on Jun. 9, 2023.

(51) Int. Cl.

| | |
|---|---|
| ***B64B 1/40*** | (2006.01) |
| ***B64B 1/62*** | (2006.01) |

(52) U.S. Cl.
CPC . *B64B 1/62* (2013.01); *B64B 1/40* (2013.01)

(58) Field of Classification Search
CPC .................................... B64B 1/40; B64B 1/62
See application file for complete search history.

(56) References Cited

U.S. PATENT DOCUMENTS

| | | | | |
|---|---|---|---|---|
| 9,823,663 | B2 * | 11/2017 | Knoblach | B64B 1/40 |
| 11,851,155 | B1 * | 12/2023 | Leidich | B64B 1/40 |
| 2017/0057607 | A1 * | 3/2017 | Knoblach | G01S 5/12 |
| 2017/0057608 | A1 * | 3/2017 | Knoblach | G01S 5/12 |
| 2017/0083019 | A1 * | 3/2017 | Knoblach | H04W 4/023 |
| 2021/0394886 | A1 * | 12/2021 | Leidich | B64D 17/80 |
| 2022/0289357 | A1 * | 9/2022 | Leidich | B64B 1/62 |

* cited by examiner

*Primary Examiner* — Tye William Abell
(74) *Attorney, Agent, or Firm* — HOLZER PATEL DRENNAN

(57) ABSTRACT

Balloon systems, such as for remote sensing activities in the upper atmosphere, having a dual fault tolerant termination system, which provide high-reliability termination. The balloon systems described herein include a primary termination device and a secondary termination device, each of the termination devices configured to provide allow lift gas expulsion while maintaining the integrity of the balloon envelope, to allow for possible reuse of the envelope. The primary termination device has long-range communication capability, to receive instructions from a ground-based command, and also has short-range communication capability, to communicate with the secondary termination device.

20 Claims, 9 Drawing Sheets

HIGH-RELIABILITY FLIGHT TERMINATION SYSTEM FOR BALLOON SYSTEMS

CROSS-REFERENCE

This application is a continuation of U.S. patent application Ser. No. 18/735,101, issued as U.S. Pat. No. 12,351,291, which was filed on Jun. 5, 2024 and titled HIGH-RELIABILITY FLIGHT TERMINATION SYSTEM FOR BALLOON SYSTEMS, which claims benefit of priority to U.S. provisional application Ser. No. 63/507,392 filed Jun. 9, 2023 and titled HIGH-RELIABILITY TERMINATION SYSTEM FOR REUSABLE HIGH-ALTITUDE BALLOONS, both of which are incorporated in their entirety.

BACKGROUND

High altitude balloons are useful platforms for applications like atmospheric sampling, celestial imaging, and communications repeating. Due to the high vantage point of the stratosphere, high altitude balloons are also becoming useful platforms for earth observation and remote sensing applications.

A typical termination system for a large, high-altitude balloon utilizes a cord called a "gore line" that effectively tears the envelope of the balloon so that the gas can escape. This typical architecture with a gore line destroys the envelope so that it cannot be reused and also may create multiple falling bodies including the balloon carcass and the payload. This type of termination architecture lacks functional redundancy. If the release by the gore line fails, the gas may take an excessive amount of time to vent and the balloon may, consequently, take a very long time to descend. This excessively slow descent lengthens the flight path, possibly creating a hazard to other flying vehicles and to the public on the ground. Because of the importance of reliable termination for stratospheric balloon systems, many large balloons have redundant termination systems. Existing regulations in some cases require redundant termination systems for large high-altitude balloons.

A combination of technological advancements in weather modeling, remote sensing equipment, and lightweight materials have enabled the development of small high-altitude balloon systems that are both relatively cheap to build and are reusable, offering a new class of affordability in high altitude balloon systems. These balloon systems can operate in high population density areas where larger stratospheric balloon systems may not be common due to flight safety concerns. The small, cheap, and reusable nature of this type of balloon system makes these systems better candidates for repeated and more frequent flights than larger high-altitude balloons. The rapidly-increasing use of these smaller reusable systems is driving development efforts to create more reliable termination systems that allow the balloons to come down in safe predetermined areas. Many small volume, high-altitude balloons, however, do not have redundant termination systems, due to their lighter weight that does not allow additional termination systems to be used.

SUMMARY

The present disclosure provides balloon systems for remote sensing activities in the upper atmosphere, the balloon system having a dual fault tolerant termination system, which provide high-reliability termination. The balloon systems described herein include a primary termination device and a secondary termination device, each of the termination devices configured to provide allow lift gas expulsion while maintaining the integrity of the balloon envelope, to allow for possible reuse of the envelope.

In one particular implementation, this disclosure provides a balloon system having a balloon envelope having an interior surface, an exterior surface, and an interior volume therein, and a primary termination device attached to the balloon envelope and providing access to the interior volume, and a secondary termination device attached to the balloon envelope and providing access to the interior volume. The primary termination device includes a long-range communication system having long-range communication capability, a first short-range communication system having short-range communication capability, and first control electronics configured to initiate a flight termination sequence of the balloon system opening a first aperture in the balloon envelope in response to receiving a termination command at either the first short-range communication system or the long-range communication system. The secondary termination device includes a second short-range communication system having short-range communication capability, and second control electronics configured to initiate the flight termination sequence of the balloon system in by opening a second aperture in the balloon envelope in response to receiving the termination command at the second short-range communication system. In some implementations, the secondary termination device is free of any long-range communication capabilities.

In another particular implementation, this disclosure provides a balloon system having a balloon envelope having an interior surface, an exterior surface, and an interior volume therein, a primary termination device attached to the balloon envelope and providing access to the interior volume, and a secondary termination device attached to the balloon envelope and providing access to the interior volume. The primary termination device includes a communication system having at least one of short-range communication capability or long-range communication capability, and first control electronics configured to initiate a flight termination sequence of the balloon system opening a first aperture in the balloon envelope in response to receiving a termination command at the communication system. The secondary termination device includes a second short-range communication system having short-range communication capability, and second control electronics configured to initiate the flight termination sequence of the balloon system in by opening a second aperture in the balloon envelope in response to receiving the termination command at the second short-range communication system.

In yet another particular implementation, this disclosure provides a method of terminating flight of a balloon system, the balloon system having a primary termination device having long-range communication capability and short-range communication capability and a secondary termination device having short-range communication capability. The method includes receiving, at the primary termination device, a first communication instructing the primary termination device to terminate the flight, and receiving at the primary termination device, a second communication transmitted in response to a failure of the primary termination system to terminate the flight, the communication including instructions to instruct the secondary termination device to terminate the flight, the primary termination device being configured to transmit an instruction to the secondary termination system via short-rang communication in response to the second communication.

In some implementations, the ground-based command is to a payload device of the balloon system, and the primary termination device receives a short-range communication from the payload to terminate the flight. Additionally, or alternately, the secondary termination device receives a short-range communication from the payload to terminate the flight.

These and other aspects of the balloon systems described herein will be apparent after consideration of the Detailed Description and figures herein. It is to be understood, however, that the scope of the claimed subject matter shall be determined by the claims as issued and not by whether given subject matter addresses any or all issues noted in the Background or includes any features or aspects recited in the Summary.

DETAILED DESCRIPTION

Figure 1:
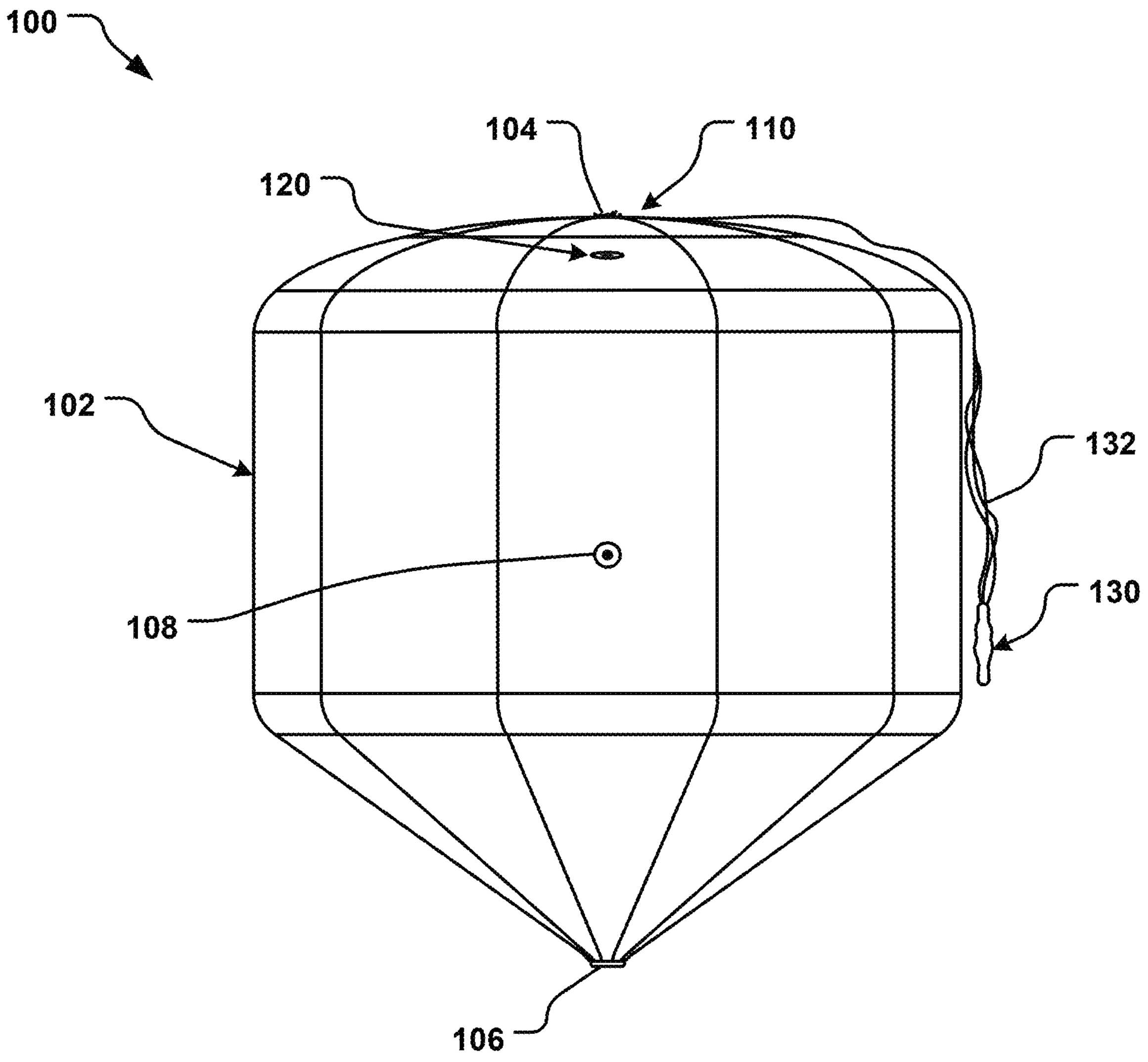
FIG. 1 is a schematic diagram of an example balloon system having a primary termination device and a secondary termination device.

As indicated above, the present disclosure is directed to balloon systems, such as for remote sensing activities in the upper atmosphere, the balloon systems having a dual fault tolerant termination system, in particular, a primary termination device and a secondary termination device. In some implementations, the balloon systems are high altitude, small volume, lighter than air systems. Small volume balloon systems are those with a fully inflated volume less than 1,000 $m^3$.

High altitude, lighter than air, balloons can be filled with a lift gas that is less dense than air, such as helium or hydrogen. When filled with the appropriate amount of lift gas, a balloon can ascend into the sky and be used to perform a useful task. As a balloon ascends, the gas within the balloon expands unless it is constrained.

Many weather-related balloons are made from a stretchy material, such as latex, that can stretch to allow the balloon to enlarge as the gas expands. This type of balloon expands until it eventually pops, leaving the payload to descend. Other balloon types are made from materials, like polyethylene, that do not stretch substantially during ascent. These balloons have an envelope that is not entirely full at launch, so that the gas has space to expand into as the balloon ascends. This type of balloon may have ducts at the base of the balloon that let gas out of the balloon when it becomes full. Such a balloon only vents gas while the gas is expanding; this venting process creates a mechanism by which a balloon can passively achieve a float state, where it is neither substantially ascending nor descending.

Historically, ducted balloons that are made of a material that does not substantially stretch are referred to as "zero pressure" balloons and are very large, e.g., 10,000 to 1,000,000 cubic meters; there are both small volume and large volume zero pressure balloons. Described herein are atypical, small zero pressure balloons and balloon systems, having a fully inflated maximum volume that may be between 10 and 1,000 cubic meters. Small zero pressure balloons behave differently than large zero pressure balloons. A small balloon with a small and lightweight payload beneath it has a different gauge pressure at the top of the balloon when compared to the gauge pressure at the top of a larger, heavier balloon at the same altitude. That difference in pressure at the top of the balloon, called "apex pressure," allows use of different mechanisms in order for the balloon to work correctly.

To inhibit over pressurization, many large zero pressure balloons have a one-way valve at the base that allows gas to flow in one direction but not the other. These are sometimes referred to as "reed valve" type structures and may be constructed from bonded flat sheets of thin film that open under a positive pressure allowing gas to escape. When not under a positive pressure, this valve is typically closed so air cannot come into the balloon envelope. A reed valve is similar to common "duck bill" valves that also allow flow in only one direction. Other vents are also commonly used.

Whether with a reed valve, vent duct, or an open-bottom balloon, when a large zero pressure balloon is done performing its useful activities at the end of a mission, a termination system initiates balloon descent. A typical termination system for a large balloon is the gore line, discussed above, that effectively tears the envelope so that the gas can escape. If the gore line fails in some manner, the balloon may not descend as planned, and may stray off course. Because of the hazards a large zero pressure balloon may pose, there is a desire to add extra safeguards against a balloon carcass, payload, or balloon/payload system from falling, e.g., at high velocity into a populated area.

The balloon systems described herein improve upon the above-described shortcomings of existing balloon systems by providing at least two termination devices in a balloon envelope that is intended to be reused.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Turning to the figures, FIG. 1 shows a balloon system 100 having a balloon envelope 102 having a top end 104 and a bottom end 106 (when the balloon system 100 is in-flight) to which a payload would be attached thereto and which may include a nadir fitting. The payload could be used for useful balloon-based tasks like remote sensing with an imaging system. The balloon envelope 102 is a flexible and optionally stretchable material, and has a first outside or exterior surface (not called out) and an opposite inside or interior surface (not visible) which define an interior volume (not visible) to be filled with a lift gas such as helium or hydrogen through a fill port 108. The balloon system 100 may be a zero pressure balloon system.

The balloon system 100 may include a parachute 130 to slow, and possibly control, the rate of descent of the balloon system 100. FIG. 1 shows the parachute 130 in an unopened configuration, attached to the balloon envelope 102 via a cord 132, e.g., to attachment points on the upper half of the balloon envelope 102. The length of the cord 132 can be designed to keep the parachute 130 out of the wake of the system 100 during descent. Additionally, the length of the cord can be designed to position the parachute 130 below the fill port 108, which allows the balloon to be filled while the parachute 130 is secured with a launch collar or other mechanism to hold the parachute 130 until the balloon system 100 is launched.

The balloon system 100 includes at least two temination mechanisms or devices for venting lift gas from the interior volume of the envelope 102, to provide redundancy for termination the flight of the balloon.

A primary termination device 110 is attached to the balloon envelope 102 at or proximate to the top end 104. An example of a primary termination device 110 is an apex fitting that could be released to intentionally cause the balloon envelope 102 to vent out the top end 104 and start to descend. In one implementation, the primary termination device 110 has long range (e.g., radio frequency (RF)) communication capabilities, to allow it to receive instructions from a user on the ground or other location, instructions such as when to open and vent. The primary termination device 110 also has short range (e.g., short-range radio frequency (RF)) communication capabilities, to allow it to send and/or receive instructions from a secondary termination device, 120 as described below.

An example of an apex fitting includes an apex box, positioned in an aperature in the envelope 102 and forming an air-tight seal with the material of the envelope 102. The apex box can encase any or all of electronics including a controller (e.g., memory, microprocessor, and/or computer-executable instructions) and communication systems.

The material of the envelope 102 is folded, pleated, gored, bunched up, or otherwise compressed and secured to the apex box, e.g., with an o-ring seal around its outer perimeter. The air-tight seal can be formed by arranging the material of the balloon envelope 102 around the o-ring seal and locking the material in position by tightening a clamp, such as a clamp ring with a turn buckle, around the apex box on an opposite side of the material. The seal between the balloon envelope and the apex box may be initially formed while the balloon envelope is inside-out.

In response to receiving a ground-based command via long-range communication, the primary termination device 110 detonates or otherwise vents lift gas from the interior of the balloon envelope 102. As used herein, the term ground-based command, and variations thereof, refers to a command that originates on Earth, such as a command sent directly to the balloon system 100 from a ground station or a command that originates on the ground but that is relayed to the balloon system 100 via a satellite. Ground-based commands are sent and received via long-range communication systems. As used herein, the term "long-range communication system" and variations thereof refer to a communication system capable of communicating over distances that span several kilometers (e.g., greater than 20 kilometers). In contrast, "short-range communication system" and variations therefor refer to a communication system with a maximum communication range of 0-3 kilometers (3 kilometers or less).

In one implementation, detonation of the primary termination device 100 causes release of the seal that separates the apex box from the balloon envelope 102 such that lift gas can rapidly escape from the apex end, e.g., the upper end 104, of the envelope 102. Notably, release of the seal facilitates a rapid release of lift gas through the opening that remained plugged by the seal throughout normal flight operations.

In different implementations, detonation releases the seal in different ways. By example and without limitation, the termination device includes a cutting mechanism (e.g., a pyrotechnic cutter) that may be controlled to sever a cord that is used to tighten the clamp ring around the o-ring seal and the apex box. When the cord is cut, the clamp ring releases its grip on the apex box such that the balloon envelope 102 is freed from the interface between the two, allowing the apex box and clamp ring to drop, e.g., down inside of the balloon envelope 102 into the interior volume.

In some implementations, primary termination device 110 includes on-board logic configured to trigger detonation (e.g., self-detonation) responsive to satisfaction of different criteria (e.g., "emergency conditions"). For example, the emergency conditions are deemed satisfied when the balloon system 100 crosses a boundary defined by geofence coordinates that are programmed in memory of the primary termination device 110. For example, the primary termination device 110 is programmed with the predefined geofence coordinates or boundary and an instruction to self-detonate in response to determining, based on location data received from a GPS receiver within the apex box, that the balloon system 100 has crossed the boundary defined by the geofence coordinates. When self-detonation is triggered, the primary termination device 110 generates a control instruction that causes release of the apex seal, as described above. Additionally or alternately, the primary termination device 110 is programmed with an instruction to detonate the apex seal upon expiration of a timer or at a particular point in time.

The balloon system 100 also includes the secondary termination device 120, positioned at a location different than the primary termination device 110; that is, it is separate from and not incorporated into or with the primary termination device 110. As with the primary termination device 110, the secondary termination device 120 is configured to intentionally cause the balloon envelope 102 to vent out in response to receipt of a flight termination command and/or satisfaction of predefined conditions pertaining to location or time. In at least one implementation, the secondary termination device 120 includes a short-range communication system but does not include a long-range communication system. In this implementation, the secondary termination device 120 is not able to receive or respond directly to ground-based commands but is able to receive and respond to commands from other short-range communication systems, such as the short-range communication system in the the primary termination device 110 and/or a short-range communication system included within a payload suspended from the balloon system 100.

Notably, a significant weight-savings is realized by not equipping the secondary termination device 120 with a long-range communication system. This is achieved without loss of any functionality due to the herein-proposed use of short-range communications as a proxy for long-range commands. According to one implementation, the primary termination device 110 or other on-board device with both long-range communication capability and short-range communication capability (e.g, the payload) receives a ground-based termination command that instructs detonation of the secondary termination device 120. This command is relayed, via on-board short-range communication system, to the secondary termination device 120. For example, a ground controller can transmit a command that instructs the primary termination device 110 to convey a termination command, using a short-range communication protocol, to the secondary termination device 120.

In one implementation, the secondary termination device 120 is programmed with logic that causes it to detonate responsive to satisfaction of some or all of the same types of "emergency conditions" described above with respect to the primary termination device 110. For example, the secondary termination device 120 is programmed with geofence coordinates defining a boundary and an instruction to self-detonate in response to determining that the balloon system 100 has crossed the boundary. Additionally or alternatively, the primary termination device 110 may be programmed with an instruction to detonate upon expiration of a timer or at a particular point in time. Notably, both the geofence coordinates and/or time-based expiration can be conditioned on values that are dynamically reprogrammable from the ground by leveraging on-board short-range communication capability of the primary termination device 110 (or in some cases, short-range communication capability of a payload (not shown)), which can, for example, receive a ground-based command and re-transmit the ground-based command to the secondary termination device 120.

Figure 2:
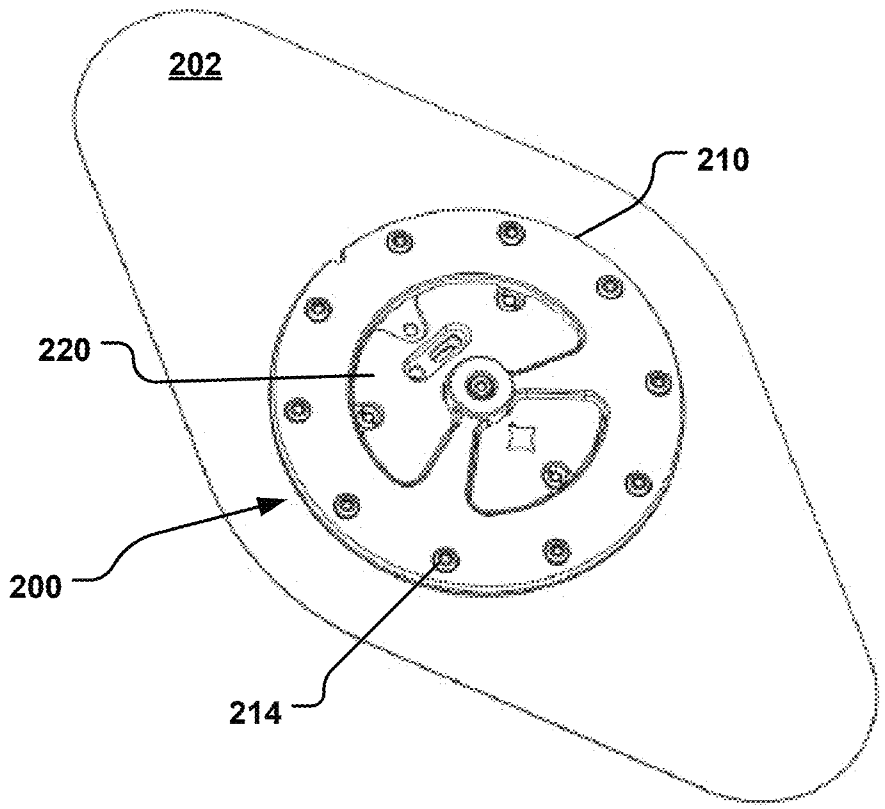
FIG. 2 is a plan view of an example termination device, in a closed configuration.
Figure 3:
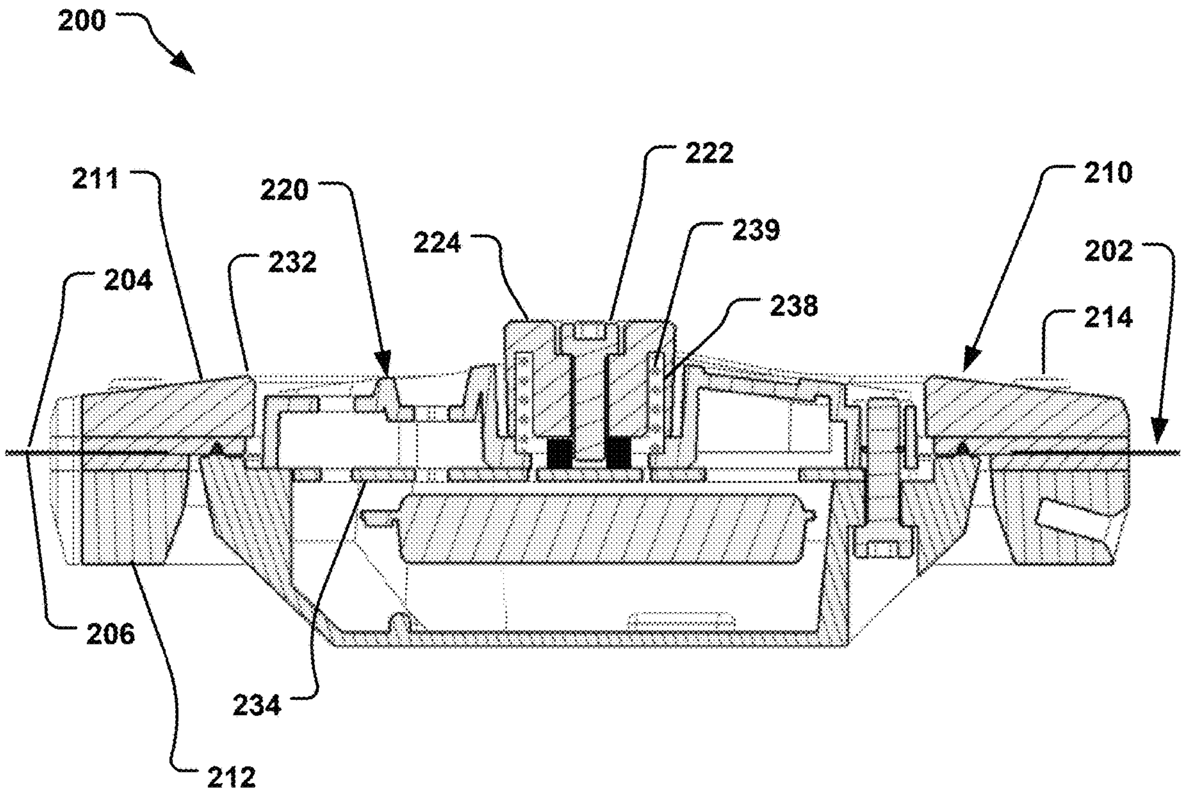
FIG. 3 is a cross-sectional view of the termination device of FIG. 2, in the closed configuration.
Figure 4:
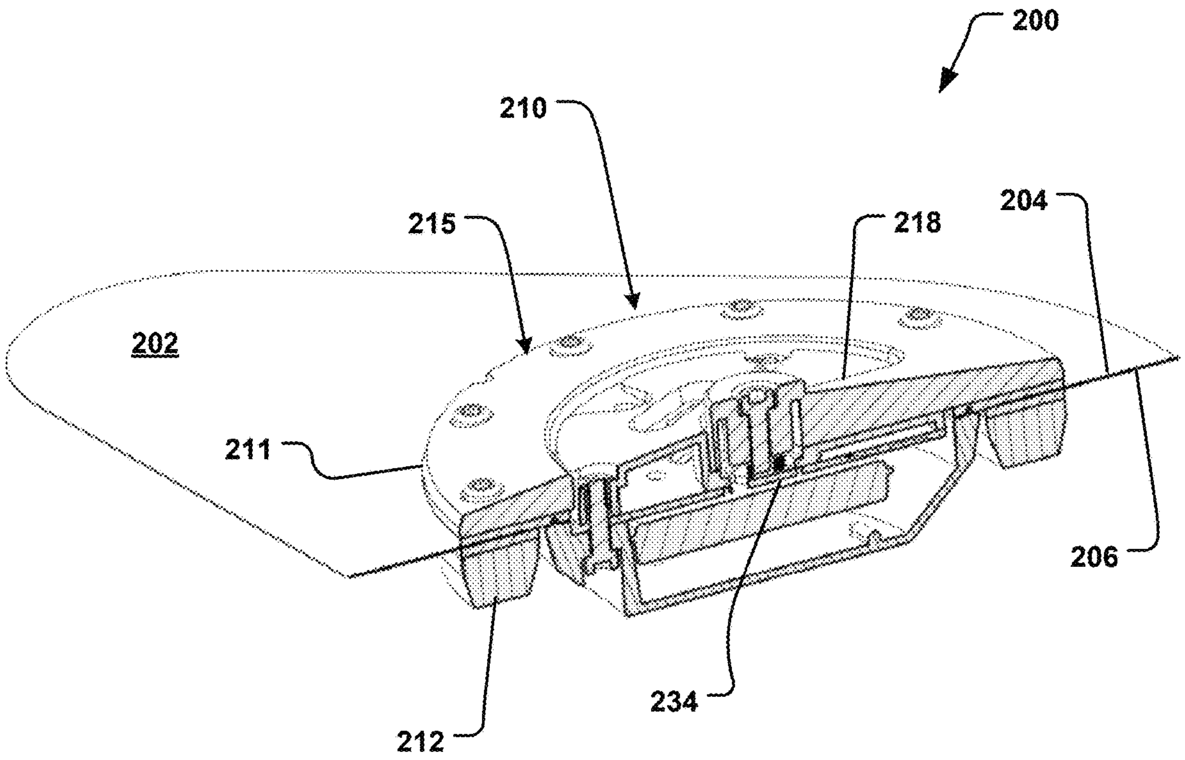
FIG. 4 is another cross-sectional view of the termination device of FIG. 2, in the closed configuration.
Figure 5:
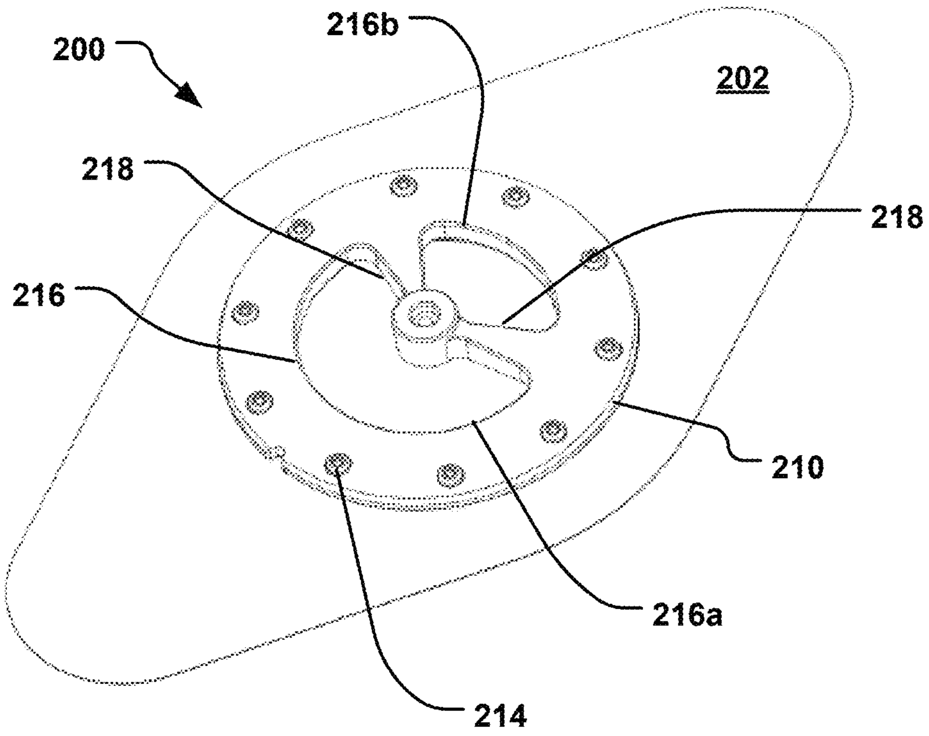
FIG. 5 is a plan view of the termination device of FIG. 2, in an open configuration.
Figure 6:
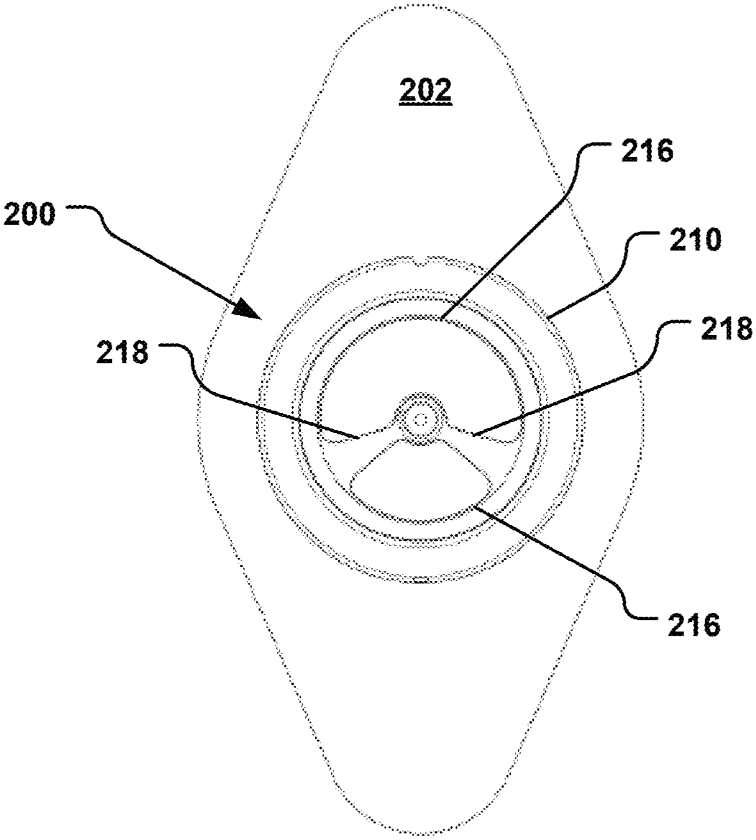
FIG. 6 is a plan view of the back side of the termination device of FIG. 2 and FIG. 5, in the open configuration.

FIGS. 2 to 6 show an example of a secondary termination device 200, such as the secondary termination device 120, having two separate and separable parts, a housing 210 and a releasable cap 220. In FIGS. 2 through 4, the device 200 is shown "closed," with the cap 220 attached to and engaged with the housing 210. In FIGS. 5 and 6, the device 200 is shown "open," with the cap 220 removed from the housing 210.

Best seen in FIGS. 3 and 4, the secondary termination device 200 is attached to a balloon envelope 202 having a first outside or exterior surface 204 and an opposite inside or interior surface 206. The housing 210, particularly, is attached to the balloon envelope 202 in an inseparable manner, e.g., using a mechanical fastener (e.g., bolt, rivet, clamp) or other fastener (e.g., an adhesive), to hold a first part 211 of the housing 210 to a second part 212 of the housing 210 with the envelope 202 therebetween. The particular example device 200 utilizes bolts 214 and gaskets to form an airtight seal between the housing 210 and the balloon envelope 202; the airtight seal may be with the outside surface 204, the inside surface 206, or both.

Best seen in FIGS. 5 and 6, the housing 210 has a body 215 (including both the first part 211 and the second part 212) with at least one aperture 216 therethrough, providing fluid (e.g., gaseous) access between the inside of the balloon envelope 202 and the external atmosphere. If multiple apertures 216 are present, they may be divided by radial arms 218 meeting at the center of the housing 210. The particular housing 210 has two apertures 216*a*, 216*b* having different shapes and areas.

Returning to FIGS. 2 through 4, the cap 220 is releasably and separably attached to the housing 210 and configured to open the apertures 216 in response to a control signal, such as a locally-generated signal. The locally-generated control signal could be generated on the balloon system in response to various triggers, such as in response to receipt of a command, in response to an on-board clock reaching a pre-programmed time, or in response to the system crossing a predefined geofence boundary. The particular design of the secondary device 200 has the cap 220 releasing from the housing 210 to open the apertures.

The cap 220 can be secured to the housing 210 by a mechanical fastener (e.g., one or more of bolts, clips, screws, etc.). In FIGS. 3 and 4, a bolt 222 is shown holding the cap 220 to the housing 210. In implementations where only one fastener, such as the bolt 222, is used to connect the cap 220 to the housing 210, the fastener can be centrally connected to the housing 210, e.g., at the intersection of the arms 218. Alternately, multiple fasteners may be used to connect the cap 220 to an outer portion of the housing body 215.

The bolt 222, other bolts, screws, clips, or other attachment mechanism holding the cap 220 to the housing 210 can be moved, removed or released by an appropriate mechanism to disengage the cap 220 from the housing 210. For example, the bolt 222 may be mechanically moved to disengage from a retainer 224; the bolt 222 can engage with a corresponding nut, either or both of which can be mechanically moved to disengage the nut from the bolt. Clips can be pivoted or actuated. In another example, the bolt 222, other bolts, screws, clips, etc. can be formed from a material having a low melting point (e.g., a metal or a plastic or polymeric material), which melts on the application of sufficient heat. For example, the bolt 222 in FIG. 5 is shown retained by a low temperature melting material, such as low melting temperature solder, which melts at temperatures as low as 140° C. Upon heating, the solder or other melting material would melt, releasing the bolt 222. In another example, the bolt 222 or other feature can be severed by a pyrotechnic cutter.

The cap 220 can include a battery or other power source for powering the mechanical actuation or for heating to release the cap 220.

Upon moving or removing the fastener holding the cap 220 to the housing 210, the cap 220 disengages from its relative position with the housing 210, in some implementations, falling away from the housing 210. Depending on the structure of the housing 210 and the cap 220 and its position in the balloon envelope 202, after disengaging the cap 220 may fall into the interior of the balloon envelope 202. The disengaged cap 220 may be secured with a lanyard to the housing 210 or other portion of the envelope 202 or may be free.

FIGS. 5 and 6 show the housing 210 after the cap 220 has disengaged, leaving the apertures 216 unobstructed. FIG. 5 shows the housing 210 from the outside of the balloon envelope 202 and FIG. 6 shows the housing 210 from the inside of the balloon envelope 202. Note that any bolt holes in the body 215 of the housing 210 are blind, in this implementation, so they do not compromise the seal between the balloon envelope 202 and the housing 210. The previously centrally located bolt is no longer present, leaving an empty retainer 224; in other cases, the bolt or other fastener may remain.

Returning to the details of FIGS. 3 and 4, the second piece 212 of the housing 210 includes an overhanging structure 232 that is used to accommodate an outer gasket that is exposed on the interior of the housing 210 beneath the overhanging structure 232 after release of the cap 220. The overhanging gasket material creates a separable seal between the cap 220 and the housing 210. In one implementation, the separable seal is created by tightening the separable bolt 222 that goes from the housing 210 to the separable cap 220.

The socket or bolt retainer 224 to which the bolt 222 is secured could be secured to a printed circuit board assembly 234, e.g., using a low temperature solder; this (solder) securement or the retainer 224 could be threaded. If the solder were heated, it could melt and release the releasable bolt 222 allowing the cap 220 to separate from the housing 210, thus opening the aperture(s) 216 through which lift gas could escape from the balloon allowing the balloon to descend. The retainer 224 may provide a structural backstop when securing the releasable bolt 222, e.g., in a thermally insulative way.

The retainer 224 could be designed with a channel 238 containing a spring 239, which could apply a force between a releasable and non-releasable portion of the assembly to forcibly open the assembly if the solder were separated from the printed circuit board assembly 234. Slots or apertures could be present in the printed circuit board assembly 234 to thermally isolate the (e.g., threaded) retainer 224 to increase the insulative properties of the retainer without damaging the board 234.

In some implementations, the secondary termination device 200 results in a slower descent than an apex type termination device (e.g., the primary termination device 110) and it would preferably be used only if there was a problem with the apex termination device.

Figure 7:
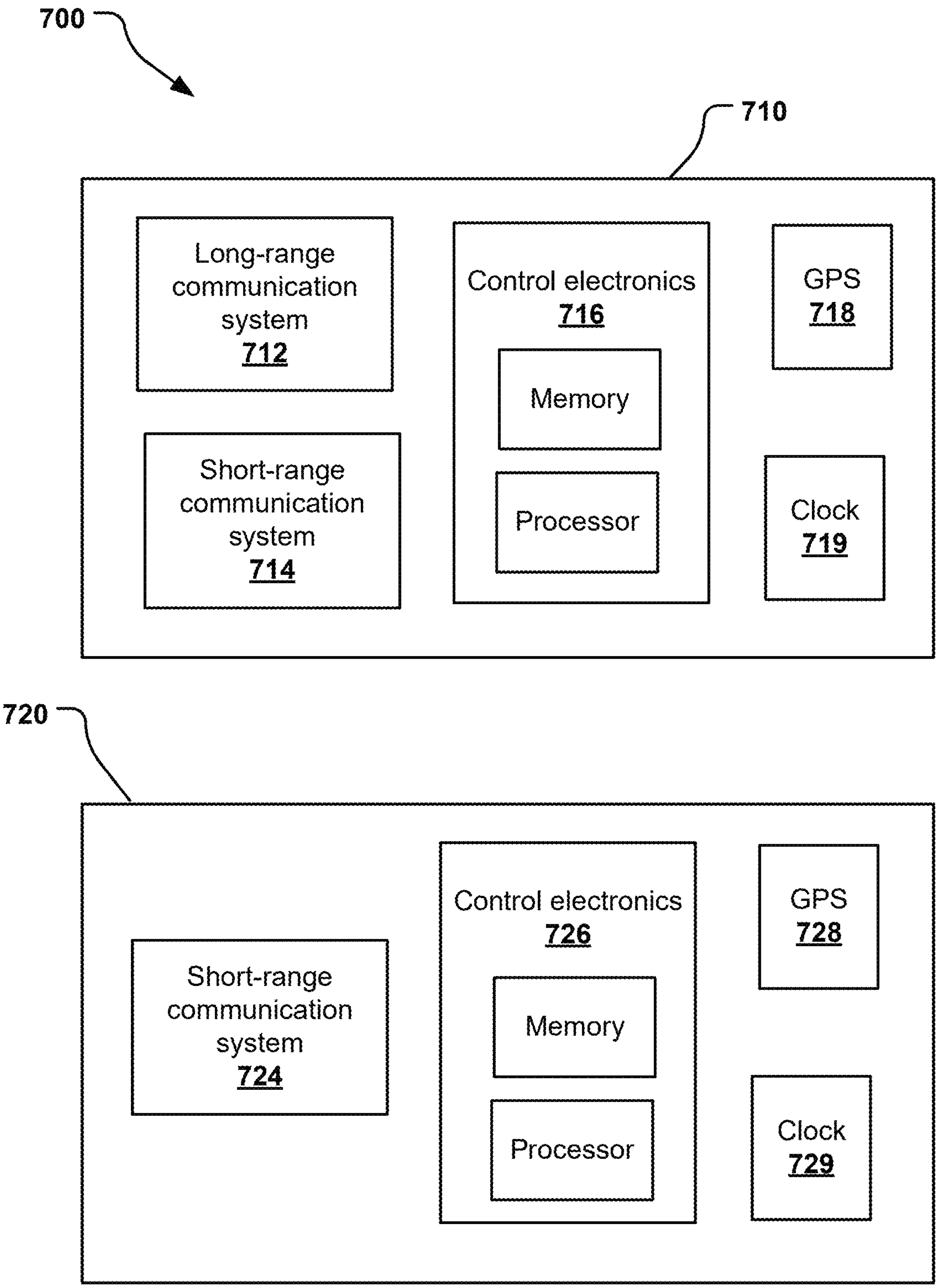
FIG. 7 is a schematic diagram of a primary termination device and a secondary termination device.

FIG. 7 schematically shows the internal components of the primary termination device and the secondary termination device, e.g., compared to FIGS. 2 through 6 which show physical features of a secondary termination device.

In FIG. 7, a balloon system 700 has a primary termination device 710, such as an apex fitting, and a secondary termination device 720, such as the device 200 of FIG. 2 through FIG. 6.

The primary termination device 710 has a long-range communication system 712 including a long-range antenna, a receiver, and optionally a transmitter, and a short-range communication system 714 including a short-range antenna, a receiver, and a transmitter. The long-range communication system 712 communicates with (e.g., receives and/or transmits) to a ground station and/or Earth-orbiting satellites, such as to a ground-based human controller. The device 710 includes control electronics 716, including a processor and memory storing instructions for executing ground-based commands, such as commands instructing detonating the primary termination device 710 and/or for relaying communications between external long-range communications systems (e.g., a control electronics 726 of the secondary device 720. The device 710 may further include a GPS unit 718 and a clock or timer 719 operably connected to the control electronics 716.

The long-range communication system 712 may receive commands sent from the ground to be executed by the control electronics 716 within the primary termination device 710. For example, a human ground-based controller may transmit a flight termination command that causes on-board control electronics 716 to generate a control signal that vents or opens the device 710, e.g., releases the plug seal of the apex fitting. The long-range communication system 712 can utilize long-range radio frequency (RF) communications, and in some embodiments, cellular frequency communications (e.g., CDMA, GSM, 2G, 3G, 4G, 4G, LTE, or 5G) or other long-range protocols.

The short-range communication system 714 communicates with (e.g., receives and/or transmits) to the secondary termination device 720. The short-range communication system 714 can utilize short-range RF, such as a short-range RF wireless local area network (WLAN), or can utilize other short-range communication protocols such as WiFi, ZigBee, Bluetooth or other protocol that can be used for a WLAN. The short-range communication system 714 may relay commands received from the ground to the secondary termination device 720 to be executed by the secondary termination device 720.

Depending upon system design, the primary termination device 710 may include more elements or fewer than all elements shown in FIG. 7.

The secondary termination device 720 has a short-range communication system 724 including a short-range antenna, a receiver, and optionally a transmitter. The device 720 also includes control electronics 726, which includes a processor and memory storing instructions for executing commands received via short-range communications, such as commands instructing detonating the primary termination device 710 and/or commands for updating stored timer or geofence coordinates. The device 720 may further include a GPS unit 728 and a clock or timer 729 operably connected to the control electronics 726.

The short-range communication system 724 may receive commands sent from primary termination device 710 to be executed by the control electronics 726 within the secondary termination device 720. For example, a human ground-based controller may transmit a command to the primary termination device 710 (using the long-range communication system 712) that relays the command to the secondary termination device 710 (using the short-range communication system 714 and 724) that causes on-board control electronics 726 to execute a flight termination mechanism that vents or opens the device 720, e.g., opens an aperture.

The short-range communication system 724 can utilize short-range radio frequency (RF), such as a short-range RF WLAN, or other short-range communication protocols such as WiFi, Bluetooth, Zigbee, or other protocol that would enable a WLAN.

Depending upon system design, the secondary termination device 720 may include more elements or fewer than all elements shown in FIG. 7.

Figure 8:
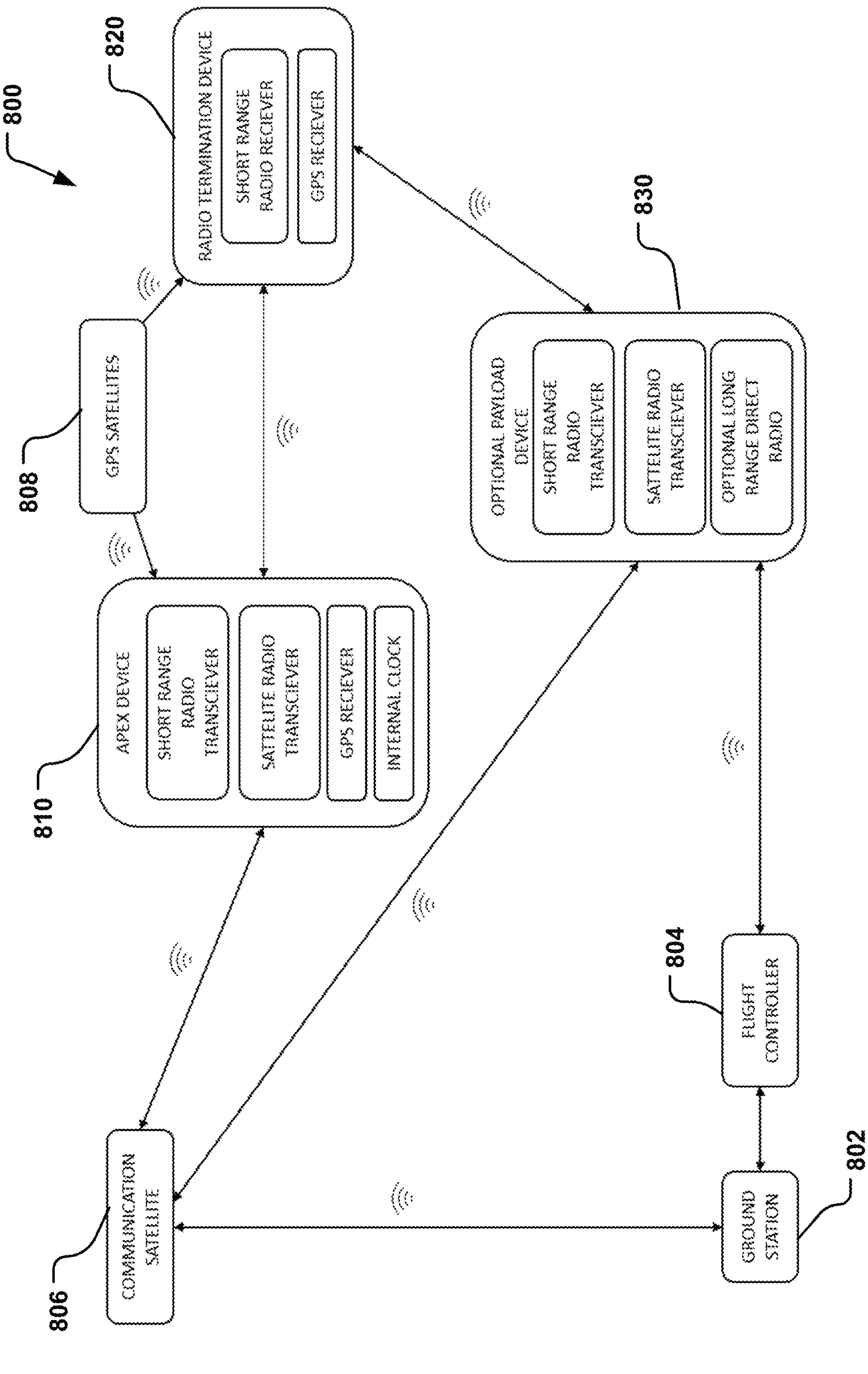
FIG. 8 is a block diagram showing the connectivity between a primary termination device and a secondary termination device.

FIG. 8 shows components in a balloon system 800 having a primary termination device and the secondary termination device and how these components may be communicatively interconnected. FIG. 8 includes the communication hardware network (e.g., satellites) that could be utilized by the balloon system to create a highly reliable system that is heavily redundant against several different types of failure mode. Not part of the balloon system itself, but part of the overall communication system, are a ground station 802 and a user or flight controller 804, at least one communication satellite 806, and at least one GPS satellite 808.

The balloon system has a primary termination device 810, a secondary termination device 820, and may include a payload device 830.

The primary termination device 810 may be an apex device and could include, e.g., a short-range radio transceiver, a satellite radio transceiver, a GPS receiver and an internal clock. The short-range radio transceiver could be used to communicate with other devices that are attached to the same balloon system, such as to the secondary termination device 820. The satellite radio transceiver could be used to communicate with the flight controller 804 via the ground station 802 that relays the signal through one or more satellites 806.

The primary termination device 810 can derive its own location by receiving signals from GPS satellites 808 with the GPS receiver.

The internal clock in the primary termination device 810 could be programmed, by a ground operation (e.g., prior to flight), to store a termination time at which the device 810 will self-terminate the flight; this would allow the balloon system to operate and subsequently descend if communication signal is lost (e.g., jammed). The internal clock in the primary termination device 810 could additionally or alternately be programmed or reprogrammed in flight through the satellite link at a time when the satellite link was functional, e.g., to update it as new information is gained about flight paths and local conditions; this would allow on-the-fly updates rendering the system able to at any time sustain a radio outage without compromising the system's termination capability.

The secondary termination device 820 could include a short-range radio transceiver for communicating with other devices in the balloon system (e.g., to the primary termination device 820 and/or the payload device 830) and a GPS receiver. As with the primary termination device 810, the secondary termination device 820 can derive its own location by receiving signals from GPS satellites 808 with the GPS receiver.

The optional payload device 830 also can have the ability to communicate with other devices in the same balloon system through a short-range radio network and/or to the flight controller 804 via a satellite modem. The optional payload device 830 could also include other communications channels, as desired, for its operation.

Figure 9:
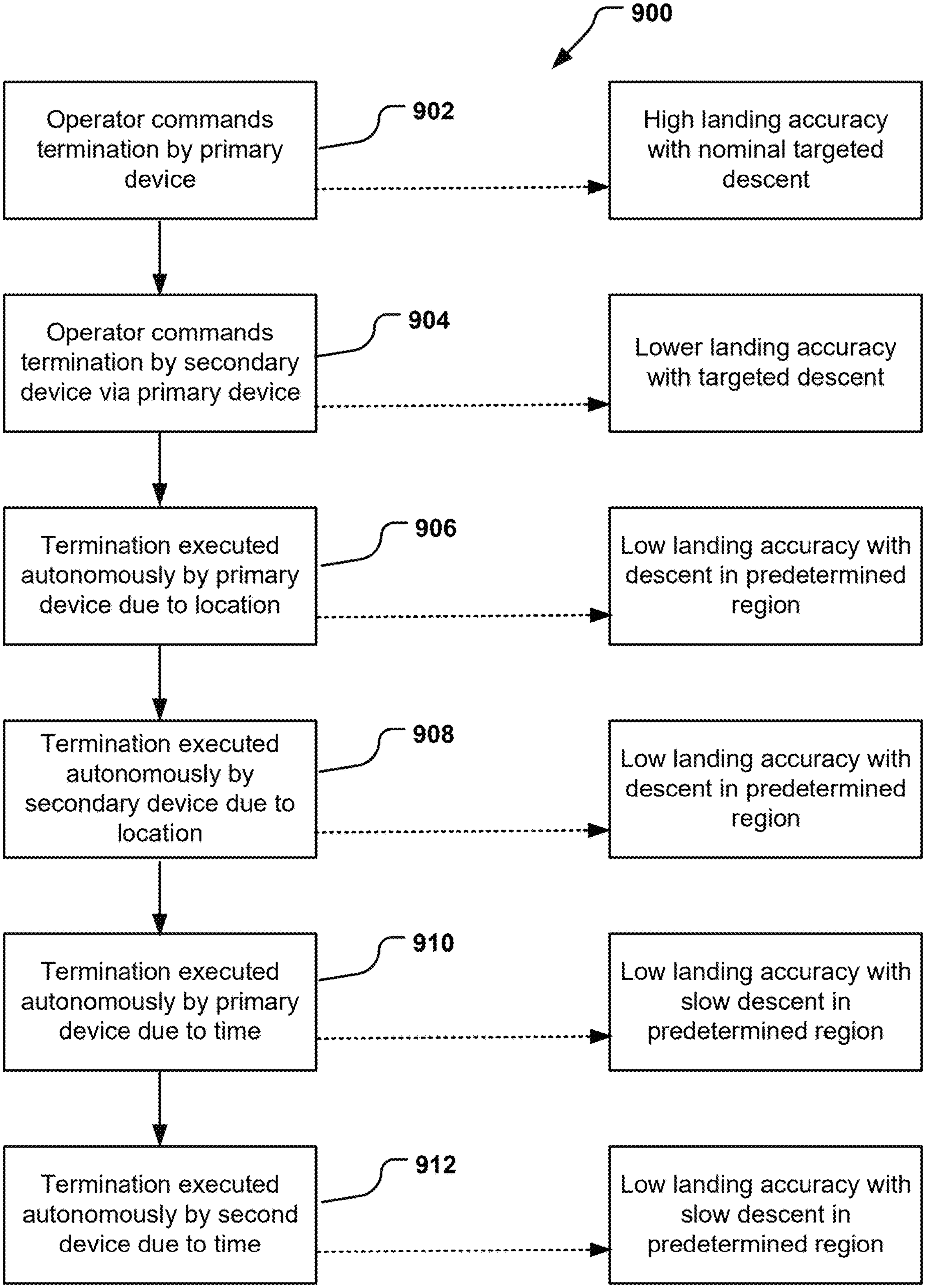
FIG. 9 is a block diagram showing, step-wise, a method for terminating a balloon system.

FIG. 9 shows a stepwise method 900 of terminating a flight of a balloon system, the balloon system having a primary termination device and a secondary termination device.

In a first step 902, an operator (e.g., a human user) instructs or commands the primary device to terminate the flight; this may be by long-range communication.

In a nominal situation, a flight controller or user (e.g., the flight controller 804 of FIG. 8) could transmit a command from a ground station (e.g., the ground station 802 of FIG. 8) that relays the signal through one or more satellites (e.g., the satellite 806 of FIG. 8) or other non-ground based relay stations to command the primary device (e.g., the primary device 810 of FIG. 8) to initiate flight termination. In this scenario, the termination would happen quickly and at a very specific time, leading to a highly accurate landing location.

Alternatively, for example, if the primary termination device does not terminate the flight in step 902, a step 904 is initiated. A user or flight controller (e.g., the flight controller 804 of FIG. 8) could transmit a signal via the satellite link (e.g., via the satellite 806 of FIG. 8) to the primary termination device (e.g., the primary device 810 of FIG. 8) that is then relayed via a short-range (e.g., radio) transceiver command to the secondary termination device (e.g., the secondary device 820 of FIG. 8) to initiate termination. In this scenario, the result would be a targeted landing of the balloon system, but at slower balloon descent speeds resulting in lower landing accuracy. Alternately, the instruction to terminate could be relayed to the secondary termination device via another balloon system element (e.g. the payload device 830 of FIG. 8).

If the secondary termination device does not terminate the flight in step 904, various back up termination steps 906, 908, 910 and 912 can be used to termination the flight; these steps 906, 908, 910 and 912 may occur in any order. For example, a valve that may normally be used for altitude control of balloons could be opened allowing the system to descend slowly to the ground as described in steps 906, 908, 910 and 912.

As shown in step 906, if for any reason it was needed, the balloon system could terminate automatically via the primary device, e.g., if the balloon crossed a set boundary (geofence) as determined by a GPS connection (e.g., to the satellite 808 of FIG. 8). Similarly, in step 908, the balloon system could terminate automatically via the secondary device, e.g., if the balloon crossed a set boundary (geofence) of the secondary device, as determined by a GPS connection. Step 908 may occur, for example, if the primary device were to lose power and be unable to initiate the flight termination mechanism. In these scenarios, the result would be a descent with low landing accuracy, but accurate enough to land in a predetermined region.

In the event that none of the mechanisms noted above in steps 902, 904, 906, 908 function, termination of the flight may by done by either or both of steps 910, 912. In certain situations, there may be a total loss of all communication (e.g., long-range data communication, short-range radio communication) including GPS. If total communication loss is expected (e.g., due to weather, solar flares, etc.), the system could be equipped with a clock or timer that could be set such that, after a certain amount of time, the system would terminate via steps 910 and/or 912. Weather models describing the forecast winds and dead-reckoning techniques could be used to approximate at what location a timer-driven termination would terminate the balloon; knowing this, a flight controller could create a location-based termination setting that could ultimately be executed using an internal clock that does not require any type of radio communication to operate. In these scenarios, the result would be a slow descent with load landing accuracy, but accurate enough to land in a predetermined region.

In all cases, the balloon can be specifically designed through the use of certain materials, balloon shapes, and ducting, even if all commanded and structured termination mechanisms fail, to thermally descend in the event of a day-night transition, reducing the likelihood of a balloon flying for multiple days.

From the foregoing, it will be appreciated that specific implementations and embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many implementations and embodiments of the invention can be practiced without departing from the spirit and scope of the invention, the invention resides in the claims hereinafter appended.

Various features and details have been provided in the multiple designs described above. It is to be understood that any features or details of one design may be utilized for any other design, unless contrary to the construction or configuration. Any variations may be made. For example, a balloon system may have the inflation locks without having an ingestion clip. Alternately, a balloon system may have an ingestion clip without utilizing the inverted inflation locks.

The above specification and examples provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. For example, elements or features of one example, embodiment or implementation may be applied to any other example, embodiment or implementation described herein to the extent such contents do not conflict. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A balloon system comprising:
- a balloon envelope;
- a first pair of communication systems comprising:
  - a long-range communication system having long-range communication capability; and
  - a first short-range communication system having short-range communication capability; and
- a termination device attached to the balloon envelope that provides access to an interior volume of the balloon envelope, the termination device comprising:
  - a second short-range communication system having short-range communication capability; and
  - second control electronics configured to initiate a flight termination sequence of the balloon system by opening an aperture in the balloon envelope in response to receiving a termination command at the second short-range communication system.

2. The balloon system of claim 1, wherein the termination device is a secondary termination device detonatable as a fail-safe mechanism in response to a detonation failure of a primary termination device of the balloon system.

3. The balloon system of claim 1, wherein the termination device is a primary termination device of the balloon system.

4. The balloon system of claim 1, wherein the first pair of communication systems is located within an electronic device located on a nadir-facing portion of the balloon system.

5. The balloon system of claim 1, wherein the first pair of communication systems is integrated within a payload of the balloon system.

6. The balloon system of claim 1, further comprising:
- a GPS unit; and
- memory storing geofence coordinates, and wherein the termination command is transmitted between the first short-range communication system and the second short-range communication system in response to determining that a current GPS position of the balloon system is external to a geofence boundary defined by the geofence coordinates.

7. The balloon system of claim 1, wherein the long-range communication system utilizes long-range radio frequency (RF) and the first short-range communication system and utilizes short-range radio frequency (RF).

8. The balloon system of claim 1, wherein the termination command is a ground-based command received at the long-range communication system and the first short-range communication system re-transmits the termination command to the second short-range communication system of the termination device.

9. The balloon system of claim 8, further comprising:
- a primary termination device that includes a third short-range communication system configured to receive commands from the first short-range communication system.

10. The balloon system of claim 9, wherein the primary termination device is located within an apex fitting attached to zenith-facing end of the balloon envelope.

11. A method of terminating flight of a balloon system the balloon system, the method comprising:
- receiving a ground-based termination command at a long-range communication system of the balloon system;
- conveying the ground-based termination command from the long-range communication system to a first short-range communication system of the balloon system; and
- re-transmitting, by the first short-range communication system, the ground-based termination command to a second short-range communication system located with a termination device of the balloon system, wherein the termination device includes control electronics configured to initiate a flight termination sequence of the balloon system by opening an aperture in a balloon envelope in response to receiving a termination command at the second short-range communication system.

12. The method of claim 11, wherein the first short-range communication system is located within an electronic device located on a nadir-facing portion of the balloon system.

13. The method of claim 11, wherein the first short-range communication system is integrated within a payload of the balloon system.

14. The method of claim 11, wherein the long-range communication system utilizes long-range radio frequency (RF) and the first short-range communication system utilizes short-range radio frequency (RF).

15. The method of claim 11, wherein the termination device is a primary termination device that lacks long-range communication capability.

16. The method of claim 15, wherein the primary termination device is located within an apex fitting attached to zenith-facing end of the balloon envelope.

17. The method of claim 11, wherein termination device is a secondary termination device detonatable as a fail-safe mechanism in response to a detonation failure of a primary termination device of the balloon system.

18. The method of claim 17, wherein the method further comprises:

transmitting, by the first short-range communication system, the termination command to a third short-range communication system located within a primary termination device of the balloon system; and in response to a detonation failure of the primary termination device, transmitting, by the first short-range communication system, the termination command to the second short-range communication system located within the secondary termination device.

19. A balloon system comprising:

a balloon envelope;

a long-range communication system having long-range communication capability;

a first short-range communication system having short-range communication capability; and a second short-range communication system configured to receive communications from the first short-range communication system, the second short-range communication system located within a primary termination device comprising first control electronics configured to initiate a flight termination sequence of the balloon system in response to receiving a termination command at the second short-range communication system; and a third short-range communication system configured to receive communications from the first short-range communication system or the second short-range communication system, the third short-range communication system located within a secondary termination device comprising second control electronics configured to initiate the flight termination sequence in response to receiving the termination command at the third short-range communication system.

20. The balloon system of claim 19, wherein the termination command is a ground-based command, and the balloon system further comprises control electronics configured to:

in response to receipt of the termination command at the long-range communication system, initiate transmission of the termination command from between the first short-range communication system and the second short-range communication system in the primary termination device; and in response to receiving an indication that the primary termination device has failed to initiate the flight termination sequence, initiate transmission of the termination command between the first short-range communication system and the third short-range communication system in the secondary termination device.

* * * * *